United States Patent [19]

Rubio

[11] Patent Number: 4,768,351

[45] Date of Patent: Sep. 6, 1988

[54] FRUIT REFRIGERATING DEVICE

[75] Inventor: Joaquín G. Rubio, Seville, Spain

[73] Assignee: Sociedad Anonima de Racionalizacion y Mechanizacion (SADRYM), Seville, Spain

[21] Appl. No.: 33,525

[22] Filed: Apr. 1, 1987

[30] Foreign Application Priority Data

Nov. 11, 1986 [ES] Spain ................................ 8601172

[51] Int. Cl.⁴ ............................................ F25D 17/02
[52] U.S. Cl. ........................................ 62/375; 62/331; 99/547; 426/485
[58] Field of Search .................. 62/63, 64, 374, 375, 62/331; 99/547; 426/485

[56] References Cited

U.S. PATENT DOCUMENTS

| | | | |
|---|---|---|---|
| 3,555,838 | 1/1971 | Morris, Jr. | 62/63 |
| 3,733,839 | 5/1973 | Waldin | 62/64 |
| 3,874,186 | 4/1975 | Bonuchi et al. | 62/63 |
| 4,388,811 | 6/1983 | Zebarth | 62/63 |

Primary Examiner—Ronald C. Capossela
Attorney, Agent, or Firm—Helfgott & Karas

[57] ABSTRACT

A fruit refrigerating device includes a cylindrical hopper receiving fruits and provided with an axially disposed rotatable worm which moves the fruits through the hopper and a cooling unit for cooling a liquid which fills the hopper and cools the fruits. An automatic depitting machine is connected to the cylindrical hopper for receiving chilled fruits therefrom and depitting the fruits. The fruit receiving hopper has two spaced-apart nozzles, through one of which fruits are fed into the hopper, and the other of which serves to discharge the fruits from the hopper and is connected to a hopper of the automatic depitting machine. Control elements are provided in the fruit refrigerating device to control the level of fruits in the fruit feeding nozzle to prevent feeding of fruits into the cylindrical hopper when the fruit level in the feeding nozzle attains its maximal value.

14 Claims, 2 Drawing Sheets

FRUIT REFRIGERATING DEVICE

OBJECT OF THE INVENTION

The present invention, as expressed in the title of the specification, relates to a fruit refrigerating device, which has been specially designed for treating fruits, and preferably olives, which are to be pitted, before being supplied to the corresponding automatic pitting machine.

BACKGROUND OF THE INVENTION

Olive pitting is currently effected in automatic machines to which, in addition to elements of which a description is not relevant hereto, clamps are used for holding the olive and a pitting piercer passes therethrough ahd thus also through the olives, therefore pitting said olives.

A considerably high efficiency, i.e., a substantial pitting speed, is achieved with such machines, thus obviously resulting in a minimum cost per pitted fruit or olive.

However, the actual clamps which hold the fruit and the pitting piercer used, in normal operation of the machine, result in breakage of or damage to a considerably large number of olives, which can reach up to about 14%, and more so in the commonly-named "gordales" or large olives.

Although the efficiency of such pitting machines renders same profitable despite the percentage of damaged olives as compared with previous pitting systems, such machines nevertheless pose a serious problem, for the percentage of broken or damaged olives is considerably high.

Despite the fact that there exist no mechanical solutions for reducing the percentage of damaged olives in such pitting machines, it has been determined that cooling the olives prior to pitting reduces the problem to a minimum, even up to the point that the percentage of olives damaged during the pitting process with adequate cooling is reduced to about 2% for the previously mentioned large olives.

DESCRIPTION OF THE INVENTION

The fruit refrigerating device in accordance with the present invention has been designed for installing in an automatic pitting machine, and for supplying the olives thereto at an adequate temperature for pitting to take place under optimum conditions.

In accordance with the above, the said device includes a cooling unit, as in a conventional refrigerator, and, due to the fact that said refrigerator must supply the olives to the pitting machine in a continuous stream, it likewise includes a hopper for receiving, immersing and conveying the fruit, a pump-and-engine set with a heat exchanger for cooling the brine or liquid in which the fruits are submerged for their conditioning, together with various elements for controlling such means.

From these basic elements, and in accordance with the essential characteristics of the invention, it has been foreseen that the hopper for immersion and displacement of the fruit is comprised by a horizontal truncated cylinder, provided with nozzles at its upper ends, one for loading the fruit and the other for unloading same, within which cylindrical hopper is established a worm or endless screw element comprised by a shaft to which is attached a helical plate, said worm being fitted projectingly at the end thereof corresponding to the loading area of the hopper by means of two sets of bearings, said worm projecting such that a bucket elevator comprised by two shafts over which runs an apertured conveyor belt to which the likewise apertured buckets are attached, may be established at the other end of the hopper, i.e., that corresponding to the unloading area for the fruit, in order to raise the fruit from within the hopper and feeding same, at the required temperature, to the feeding hopper of the pitting machine.

In order to suitably control displacement of the olives within the hopper and unloading thereof, both the bucket elevator and the worm are driven by respective engine variators.

The hopper is filled with the brine solution or liquid with which the olives are to be treated, said hopper being part of a closed circuit for circulation of the brine, which circulation is aided by the respective engine pump and the heat exchanger, the latter cooling the brine by means of an auxiliary circuit containing water and alcohol, which constitutes the actual refrigerating unit, likewise aided by an engine pump, the cooling gas being thus completely isolated from the fruit and cooling the brine through the mentioned exchanger.

Turning back to the circuit for circulation and cooling of the brine, said circuit includes filters for retaining the solid particles which might be present in suspension in the brine, thereby preventing same from reaching the exchanger, the said filters being established in two parallel sections of the ducts, in such a way that when one filter is working, the other may be cleaned or substituted, or vice versa.

In order to control loading of the hopper, there are provided two electrodes at its loading nozzle, for controlling maximum and minimum levels of fruit load. Thus, when the fruits come into contact with the electrode of maximum level, the electrode sends information to the element feeding the fruit into the hopper, causing same to stop, until the contact between the fruit and the lower electrode, corresponding to the minimum level, is broken, at which moment feeding or loading of the hopper begins again.

The engine variator associated to the worm ensures a constant velocity in the angular movement thereof, which means that the olives within the hopper are displaced at a constant speed, it being possible to vary such speed within predetermined limits by acting on said engine variator.

Unloading of the olives is controlled in a similar manner, and the apertured nature of the belt comprising the elevator and of the buckets complementing same ensures perfect drainage of the brine from the olives before they leave the refrigerating unit.

In accordance with a further characteristic of the invention, the engine variator which drives the bucket elevator is in turn controlled by a pair of maximum and minimum level electrodes placed over the receiving hopper of the automatic pitting machine in a manner such that control of the fruit leaving the refrigerating unit is effected in accordance with the specific requirements of the pitting machine, i.e., depending on the actual number of olives in the feeding hopper.

In addition to the structure described, an adjustable thermostat is provided within the hopper of the refrigerating unit, in contact with the brine, and associated to the compressor of the cooling unit, in order that said cooling unit enters into operation when the brine reaches a predetermined maximum temperature, and stops when said thermostat detects the minimum predetermined temperature. In this connection, a temperature range of from −2° C. to +2° C. has been established for detection by the thermostat as the optimum working range for the cooling unit.

In order to simplify servicing and maintenance of the device, it has been foreseen that the bucket elevator constitutes an independent unit with respect to the hopper, and may thus be easily separated therefrom, and, furthermore, said hopper, and the brine and water-/alcohol circuit tubing are thermally insulated in order to increase the energy output of the assembly.

For cooling, the brine leaves the hopper through a nozzle provided with a grid which prevents the olives from entering the recycling circuit, and the said brine returns to the hopper after cooling through a plurality of tubes provided along the upper area thereof, which allows optimum distribution of the brine at low temperature reaching the hopper in order to achieve a suitable thermal uniformity.

DESCRIPTION OF THE DRAWINGS

In order to complete the description being made, and to assist a better understanding of the characteristics of the invention, a set of drawings is attached to the present specification as an integral part thereof, wherein the following has been shown in an illustrative and non-limiting manner.

PREFERRED EMBODIMENT OF THE INVENTION

Figure 2:
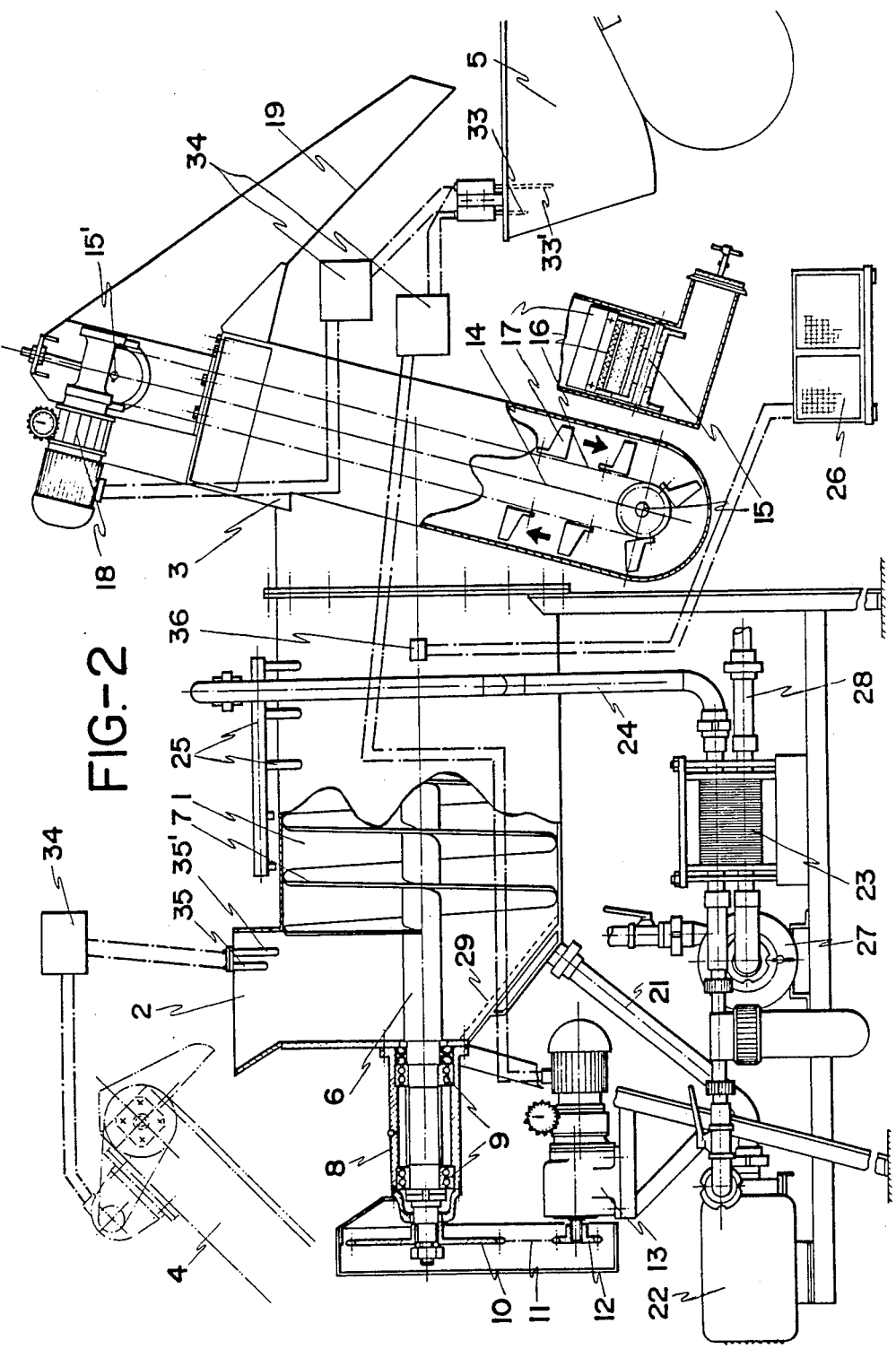
FIG. 2 shows a side elevational view of a practical embodiment of the same fruit refrigerating device, cut away at different levels in order to clearly show the structure thereof.

In the light of the preceding figures, it can be seen that the fruit refrigerating device being described is comprised by a hopper 1, made of a truncated horizontal cylinder, wherein are established an input nozzle 2 and an output nozzle 3, at the upper ends thereof, the input nozzle 2 being designed for receiving the product with the aid of an auxiliary conveyor belt 4, shown by dotted lines in FIG. 2, or any other conventional means, whilst the output nozzle 3 is in turn designed for feeding the suitably cooled fruit to the feeding hopper 5 of the automatic pitting machine in question, before which the fruit refrigerating device is established in order to obtain the desired effects of avoiding damage to the olives during pitting.

Within the hopper 1 there is established a worm comprised by a shaft 6 to which is fitted a plate 7 of helical surface having a maximum diameter equal to that of the cylindrical hopper 1, said shaft 6 being mounted projectingly within a tubular support 8 stiffened to the base of the input area of hopper 1 by means of two sets of bearings 9, the corresponding toothed wheel 10 being coupled to the free outer end of said shaft 6 which, by means of chain 11, receives the movement of cog 12, this latter being coupled to the output of engine variator 13 which drives the said worm 6-7.

The projecting assembly of the worm within the hopper 1 allows the provision of a bucket elevator 14 at the end thereof, i.e., the end corresponding to the output nozzle 3, which elevator is made up by two shafts 15—15′ over which runs an apertured conveyor belt 16, shown in detail in FIG. 2, to which the likewise apertured buckets have been attached, the said elevator being driven by a further engine variator 18 which transmits movement to one of the elevator shafts, specifically to the upper shaft 15′.

The buckets 17 raise the olives from the floor of the hopper, with perfect drainage thereof, and unload them on an inclined plane 19 directed towards the feeding hopper 5 of the automatic pitting machine.

Figure 1:
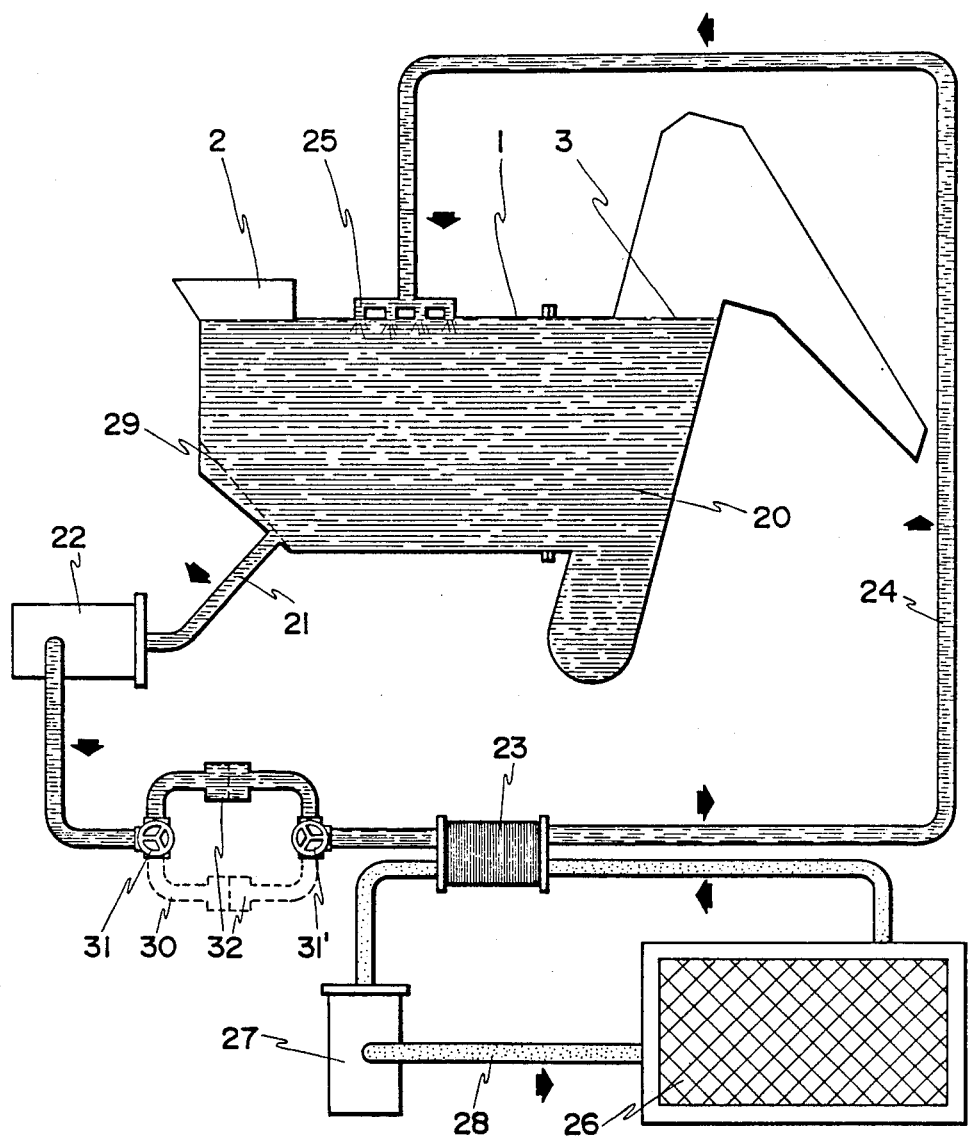
FIG. 1 shows a diagrammatic representation of the fruit refrigerating unit in accordance with the object of the present invention.

The hopper 1 is filled with the brine solution 20 or liquid in which the fruit is to be treated, as shown specifically in FIG. 1, a lower duct 21 emerging therefrom and having an engine pump 22 for conveying the brine towards an exchanger 23, after which the brine returns to hopper 1 through duct 24, along the upper area thereof and through a plurality of tubes 25 to ensure uniform distribution of the cooled brine within the hopper, and thus also to ensure uniform temperature in said hopper.

Cooling of the brine takes place within the exchanger 23 due to a cooling unit 26, likewise aided by a pump 27 which drives the cooling liquid 28, being a mixture of water and alcohol, through said exchanger 23.

Turning back to the brine circuit 20, a grid 29 is established at the entry thereof to prevent the olives from entering the circuit 21 for recycling of the said brine, a by-pass 30, aided by respective regulating cocks 31—31′, being provided between the engine pump 22 and the exchanger 23, respective filters 32 which prevent possible solid particles which may be present in suspension within the brine from reaching the exchanger 23 being established in the said by-pass, at the corresponding, parallel sections of duct 21. The existance of two such parallel filters is obviously to allow cleaning or substitution of one of the said filters whilst the other remains in operation.

Supply of treated or cooled olives to the hopper 5 of the automatic pitting machine is effected automatically in accordance with the specific requirements thereof. In order to achieve this end, two maximum and minimum electrodes 33 and 33′ respectively are located within hopper 5, which electrodes control, through the electric panel 34 of the machine, the engine variator 18 of the bucket elevator 24 and the engine variator 13 which drives the worm 6-7, as diagramatically shown in FIG. 2. More specifically, when contact between the lower level electrode or sensor 33′ and the olives is broken, said electrode causes the engine variators 18 and 13 to start, and when contact between the electrode 33, corresponding to maximum load of hopper 5, and the olives is established, the said engine variators stop.

Furthermore, two further electrodes 35—35′ are provided on the input nozzle 2 of hopper 1 of the device, whereby feeding of hopper 1 is likewise controlled by means of conveyor belt 4, such that the electrode 35′ detect a minimum level in said hopper and sends information to the electric controls 34 in order to feed the conveyor belt 4, such feeding ending when electrode 35 detects maximum level through contact thereof with the fruit.

Finally, and in order to control the temperature of the brine within hopper 1, an adjustable thermostat 36 is provided within the said hopper, electrically placed with the compressor of the cooling unit 26, as likewise diagramatically shown in FIG. 2, such that the said thermostat controls operation of the cooling unit in order to maintain the temperature within the hopper 1 at predetermined values which as mentioned hereinbefore, are preferably of between +2° C. and −2° C.

As can be seen from the comparison of FIGS. 1 and 2, and in order to facilitate servicing of the device, the bucket elevator 14, together with its driving means, form an independent unit from the hopper 1, thus being easy to separate therefrom.

It is not deemed necessary to extend the present description any further for a person skilled in the art to understand the scope of the invention and the advantages derived therefrom.

The materials, shape, size and arrangement of the elements may vary, provided they do not imply a modification to the essentiality of the invention.

The terms used in the description of this specification should be understood to have a wide and non limiting meaning.

I claim:

1. A combination comprising:
   a first hopper for receiving fruits to be cooled, for cooling said fruits and for discharging the cooled fruits, said hopper being truncated hollow horizontal cylinder filled with cooling liquid and including first and second upwardly extending spaced apart nozzles, fruits to be cooled being fed into the first hopper through the first nozzle and after cooling being discharged from the second nozzle, said cylinder being provided with an axially disposed rotatable worm which moves the fruits from the first nozzle toward the second nozzle;
   first cooling means for cooling said liquid to a desired temperature and for causing said cooled liquid to circulate through the cylinder;
   second means communicating with said second nozzle to remove the cooled fruits from the cylinder and through the second nozzle;
   an automatic depitting machine having a second feeding hopper, said second means communicating with said second hopper to supply said cooled fruits thereto whereby said cooled fruits are supplied to said machine and are depitted therein; and
   third means for conveying fruits to be cooled to said first nozzle for feeding said fruits to be cooled to said cylinder.

2. The combination of claim 1 wherein said fruits are olives and wherein an inclined plane is disposed between the second means and the second hopper whereby the fruits will roll downward on said plane from the second means into the second hopper.

3. The combination of claim 2 wherein said first nozzle has established therein spaced apart predetermined maximum and minimum levels for fruit and further includes fourth means including a first electrode disposed in the first nozzle and coupled to said third means for disabling said third means when the fruit level in said first nozzle attains said maximum level and fifth means including a second electrode disposed in the first nozzle and coupling to said third means for enabling said third means when the fruit level in said first nozzle falls to said minimum level.

4. The combination of claim 3 wherein said second hopper has established therein spaced apart predetermined maximum and minimum levels for fruit and further includes sixth means including a third electrode disposed in the second hopper and coupled to said second means for disabling said second means when the fruit level in the second hopper attains said maximum level and seventh means including a second electrode disposed in the second hopper and coupled to said second means for enabling said second means when the fruit level in the second hopper falls to said minimum level.

5. The combination of claim 4 wherein said third means includes a conveyor.

6. The combination of claim 5 wherein the cooling liquid is brine, said first means including a hollow heat exchanger having an outer surface engaging the brine, the inner surface of said exchanger receiving a refrigerant fluid composed of water and alcohol.

7. The combination of claim 6 wherein said second means includes an elevator.

8. The combination of claim 7 wherein said first means includes tubes disposed in the cylinder above the worm to discharge said cooling liquid into the cylinder and a drain disposed in the cylinder below the worm for removing cooling liquid from the cylinder, said first means including a mechanism disposed outside of the cylinder and interconnecting the tubes and drain to cause said brine to be recirculated through the cylinder.

9. The combination of claim 8 wherein said first means includes a filter device for preventing any solid particles in said cooling liquid from reaching the exchanger.

10. The combination of claim 9 further including a plate in the shape of a helix having an outer diameter slightly less than the inner diameter of the cylinder and disposed in the cylinder, said helix having an axis coincident with the axis of the worm and being secured to said worm to rotate therewith.

11. The combination of claim 10 wherein the elevator is a bucket elevator.

12. The combination of claim 11 wherein said drain is provided with a grid which prevents fruit from entering the drain.

13. The combination of claim 12 wherein said worm rotates at a constant angular velocity.

14. The combination of claim 13 wherein said first means maintains the cooling liquid at a temperature range such that the temperature of the cooled fruit is held within the temperature range of −2° C. to +2° C.

* * * * *